United States Patent [19]

Taguchi

[11] 3,900,815

[45] Aug. 19, 1975

[54] ELEMENT FOR DETECTION OF COMBUSTIBLE GASES AND SMOKE

[76] Inventor: Naoyoshi Taguchi, 1-2 Uemachi Ikeda Nagata-ku, Kobe, Japan

[22] Filed: Sept. 19, 1973

[21] Appl. No.: 398,710

Related U.S. Application Data

[60] Continuation of Ser. No. 164,850, July 26, 1971, abandoned, which is a division of Ser. No. 800,798, Jan. 21, 1969, Pat. No. 3,625,756.

[52] U.S. Cl. .............. 338/34; 23/254 E; 200/61.03; 340/237

[51] Int. Cl. .............. H01c 13/00

[58] Field of Search .............. 338/34, 38; 200/61.03, 200/61.04, 61.06; 340/237, 235; 73/73; 23/254 E

[56] References Cited

UNITED STATES PATENTS 3,142,811 7/1964 O'Connell .............. 338/308 X

*Primary Examiner*—C. L. Albritton

[57] ABSTRACT

A gas sensing element including a semiconductor material which changes its electroconductivity when it adsorbs a gas. In manufacture of the element, the semiconductor material is mixed with a material such as stearic acid which evaporates, sublimates or burns away when heated and produces a number of pores therein. When the mixture is applied to a suitable supporting material between a pair of electrodes and then heat-treated, the resultant gas sensing element has an improved rate of change of electroconductivity.

7 Claims, 3 Drawing Figures

ELEMENT FOR DETECTION OF COMBUSTIBLE GASES AND SMOKE

This application is a continuation of application Ser. No. 164,850, filed July 26, 1971, now abandoned and which application is a division of application Ser. No. 800,798 filed Jan. 21, 1969, now U.S. Pat. No. 3,625,756.

This invention relates to a gas sensing element including a semiconductor material which changes its electroconductivity when it adsorbs a gas, and method of manufacturing it.

It is well known that some metal oxide semiconductor materials such as $SnO_2$, NiO, and $Cr_2O_3$ change their electroconductivity when they are exposed to an atmosphere containing specific gases, and it is also well known that a gas sensing element is obtained by disposing a film of such semiconductor material between a pair of electrodes. Thus concentrations of gases can be detected by connecting the electrodes to a voltage source and detecting a current flowing therethrough.

In the prior art, thin film semiconductor elements have been produced generally by plating or evaporating a metal film on a ceramic support and oxidizing the metal film or by spraying a solution of metal chloride onto a support in a high temperature oxygen atmosphere. The thin film thus obtained is rigid and stable, but its crystal structure is too perfect to produce lattice defects in response to adsorption of gas with the result that its rate of change of electroconductivity with respect to gas concentrations is low.

Efforts have been made to manufacture a sensing element by sintering powdered metal oxide semiconductor materials, but the adsorption area of the element was materially reduced by sintering and accordingly, its detection sensitivity was also reduced.

Therefore, an object of this invention is to provide a gas sensing element having an improved rate of change of electroconductivity, and therefore, an improved gas detection sensitivity.

According to a process in accordance with this invention, a powdered metal oxide semiconductor material is mixed with a material, such as stearic acid, which evaporates, sublimates or burns away when heated and produces a number of pores therein. The mixture is applied to a suitable supporting material such as ceramic and then heated at an elevated temperature. The resultant element exhibits a remarkably improved rate of change of electroconductivity.

Other objects and features of this invention will become more apparent from the following description in conjunction with several examples with reference to the accompanying drawings.

In the drawings.

Throughout the drawings, like reference numerals are used to denote like structural components.

EXAMPLE 1

Figure 1:
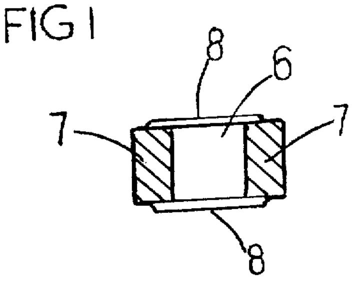
FIG. 1 is a longitudinal sectional view representing an embodiment of the gas sensing element according to this invention.
Figure 4:
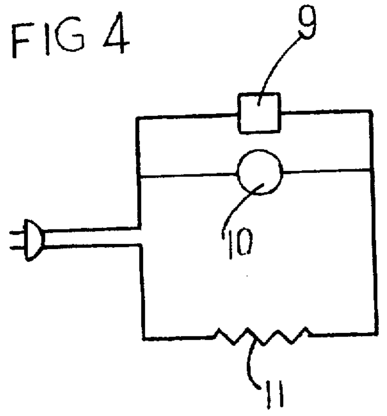

Referring to FIG. 1, the gas sensing element in accordance with the invention comprises a pair of disc-shaped electrodes 1 and 2, a cylindrical supporting body 3 made of an insulating material such as ceramic and a metal oxide semiconductor layer 4 applied onto the surface of the body 3 and a part of the each electrode. The semiconductor layer 4 is prepared in the following manner:

1 gram of $SnCl_4$ is mixed with 8 grams of stearic acid. Though the weight ratio is not critical, an insufficient quantity of stearic acid is undesirable since it results in fumes of $SnCl_4$. The mixture is heated and agitated to produce a dark brown liquid. This liquid is applied onto the surface of the supporting body 3 as shown in FIG. 1 by dipping or spraying, and is then heated in air at about 700°C.

The rate of change of electroconductivity of the resultant gas sensing element is remarkably greater than that of the prior elements having a Nesa film prepared from an aqueous hydrochloric acid solution of $SnCl_4$.

EXAMPLE 2

Figure 2:
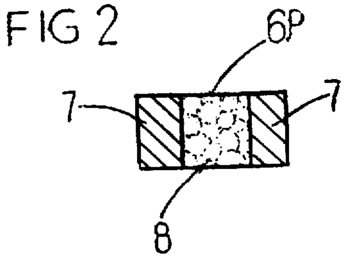
FIG. 2 is a longitudinal sectional view representing another embodiment of gas sensing element according to this invention.
Figure 5:
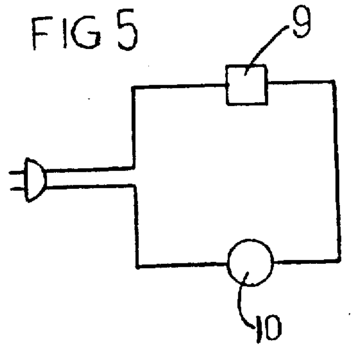

FIG. 2 shows a modified gas sensing element which comprises a pair of disc-shaped electrodes 1 and 2, a porous ceramic body 3 and a semiconductor material 4 filling the pores in the ceramic body 3. The semiconductor material 4 is prepared in the following manner:

25 to 50% by weight of stearic acid is added to finely powdered $SnO_2$ and then diluted suitably with organic solvent such as benzene. The solution is impregnated in the ceramic body 3 and heated at about 700°C in air.

The resultant element exhibits a highly improved characteristic in comparison with those prepared with the same powdered material mixed only with water.

EXAMPLE 3

Figure 3:
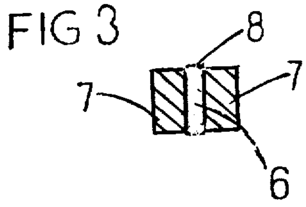
FIG. 3 is a longitudinal sectional view representing a further embodiment of gas sensing element according to this invention.
Figure 1:
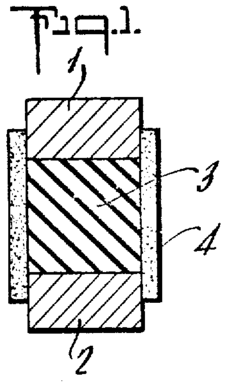
Figure 2:
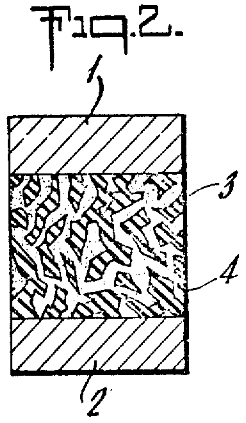
Figure 3:
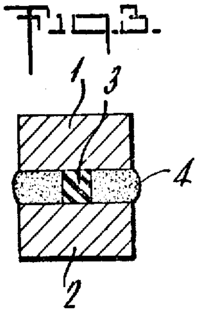

FIG. 3 shows a further modification of a gas sensing element which comprises a pair of disc-shaped electrodes 1 and 2, an insulating separater 3 for maintaining a gap between the electrodes and a semiconductor material 4 disposed in the gap between the electrodes 1 and 2. The semiconductor material 4 is prepared in a manner similar to that described in connection with EXAMPLE 2.

Furthermore, a sensing element formed of a semiconductor mixture consisting of one part of finely powdered $SnO_2$ and 0.5 to 2 parts of the mixture of stearic acid and $SnCl_4$ as described in connection with EXAMPLE 1 can conduct a relatively large current and will exhibit an extremely high sensitivity.

Though the above examples are described in conjunction with the sensing elements using a reduction type metal oxide semiconductor such as $SnO_2$, the principle of this invention is also applicable to the other types of metal oxide semiconductor materials, such as NiO and $Cr_2O_3$. Moreover, materials such as wax, sugar, polyvinyl alcohol, acryl resin and starch, which have large molecular weights and will evaporate or burn away when heated, can be used as the additive in place of stearic acid. In the case of starch, however, it must be very finely powdered, otherwise the adhesive bond between the coated film and the supporting body may be reduced and the electrical properties may not be uniform.

The gas sensing element according to this invention is so sensitive that an amplifier circuit is not required when the element is used for an alarm device. The present element is also sensitive to smoke and is therefore useful as a fire alarm. Moreover, the element is also sensitive to alcohol vapor in human breath so that it may be also used as a detector of alcohol vapor.

I claim:

1. A gas sensing element comprising a porous body that includes a powdered tin oxide semiconductor and at least two electrodes secured to said body for the passage of an electric current therethrough.

2. A gas sensing element as claimed in claim 1 wherein said tin oxide is present in admixture with at least one organic material selected from wax, sugar, polyvinyl alcohol, resin, starch and stearic acid, and the porosity of the body of said gas sensing element is induced by volatilization of said organic material.

3. The gas element of claim 2 wherein said resin is an acrylic resin.

4. A gas sensing element comprising a porous body which includes a powdered tin oxide semiconductor and at least two electrodes secured to said body for the passage of an electric current therethrough, said tin oxide is present in admixture with an organic material, said porosity of said body is induced by volatilization of said organic material and said organic material is stearic acid.

5. The gas element of claim 4 wherein said stearic acid is present in a proportion of 25 percent to 50 percent by weight of said tin oxide.

6. The gas element according to claim 5 wherein said mixture is heated at a temperature of about 700°C.

7. The gas element according to claim 6 wherein said mixture is heated in the presence of air.

* * * * *

UNITED STATES PATENT OFFICE
CERTIFICATE OF CORRECTION

Patent No. 3,900,815 Dated August 19, 1975

Inventor(s) Naoyoshi Taguchi Page 1 of 2

It is certified that error appears in the above-identified patent and that said Letters Patent are hereby corrected as shown below:

All drawings presently forming part of the issue patent are canceled and the enclosed drawings are substituted herewith.

Signed and Sealed this

*seventeenth* Day of *February 1976*

[SEAL]

*Attest:*

RUTH C. MASON
*Attesting Officer*

C. MARSHALL DANN
*Commissioner of Patents and Trademarks*